April 26, 1927.
A. RADTKE
1,626,553
PORTABLE TREE FELLING SAW
Original Filed June 3, 1924
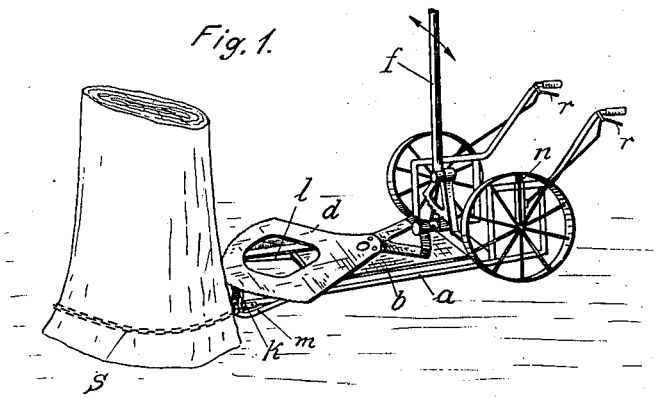
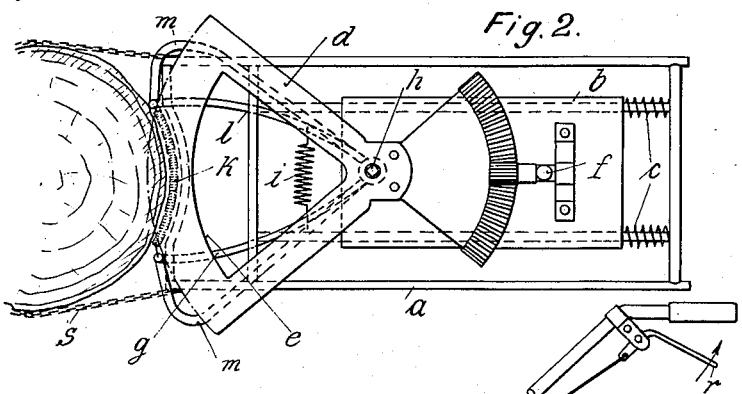
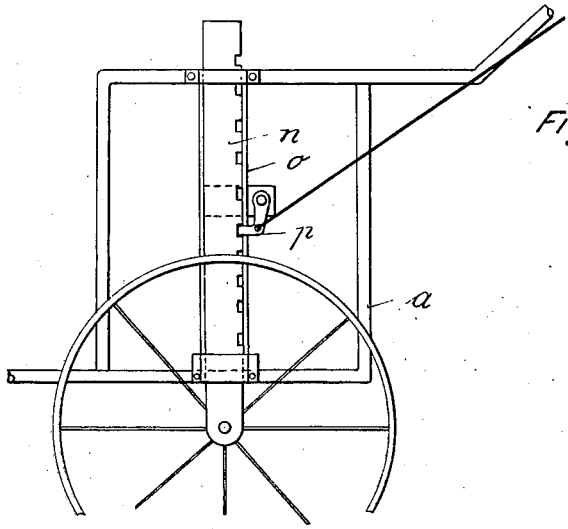

Patented Apr. 26, 1927.

1,626,553

UNITED STATES PATENT OFFICE.

ALBERT RADTKE, OF BERLIN, GERMANY.

PORTABLE TREE-FELLING SAW.

Application filed June 3, 1924, Serial No. 717,505, and in Germany May 5, 1923. Renewed December 14, 1926.

This invention relates to a portable tree-felling saw and it consists in constructing the saw blade as a sector equal to a quarter of a circle having an aperture through which the wood chips drop into the chip collecting device which may consist of an elastic receptacle, said saw blade being mounted on a movable slide so that it can execute an oscillating movement in horizontal plane.

The invention consists further in that the driving mechanism for the saw can be raised and lowered by means of hand levers in such a manner that a bar on which the movable frame is fixed is guided in a U-iron and adapted to be raised and lowered by a pawl being pulled out of engagement and brought in engagement with the aid of a pull rope with notches of said bar.

An embodiment of the invention is shown by way of example on the accompanying drawing, in which:

Fig. 1 is a perspective view of the tree-felling saw.

Fig. 2 is a plan view of Fig. 1.

Fig. 3 shows part of the adjusting mechanism in elevation.

The tree-felling machine or saw consists, according to the invention, of a frame $a$ on which the slide $b$, guided in a convenient manner, is arranged which is continuously pressed forward by the action of springs $c$. On the slide $b$ the saw blade which has the shape of a sector equal to a quarter of a circle is arranged, this saw blade having an aperture $e$. A simple lever mechanism serves for producing the oscillation of the saw blade in horizontal direction. When the hand lever $f$ is moved to and fro the saw blade $d$ is oscillated by means of toothed crown transmission. Directly under the saw frame $a$ a chip collector is arranged which consists of arms $g$ hingedly mounted under the saw frame on a pivot pin $h$ and acted upon by a spring $i$ in such a manner that a spring $k$ arranged above the arms $g$ or a bag $l$ attached to said spring is permanently pressed against the tree to be felled. The bag $l$ is further held by the bows $m$. The mechanism for raising and lowering the saw frame consists of a bar $n$ on which the movable frame $a$ is fixed, said bar being guided in U-irons $o$. A pawl $p$ engaging with notches of the bar is adapted to be pulled out of engagement with said notches by means of a pull rope so that the saw frame can be raised or lowered by operating the hand levers $r$.

A chain $s$ is preferably wound around the tree to be felled and attached to the sawing machine in order to ensure that the saw blade is permanently pressed against said tree.

The invention presents considerable advantages over the tree-felling saws of known construction, for instance that it can be used even when trees are standing close together and that the chip-collecting device, arranged under the machine does not interfere in the least with the working of the saw blade.

I claim:—

A portable tree-felling saw of the type described comprising in combination with the movable frame and with the saw blade having a large aperture, two arms hingedly mounted under said saw frame, a spring for pulling said arms together, a spring above said arms, a bag attached to said last mentioned spring and bows for holding said bag, said last mentioned spring being pressed by said arms against the tree to be felled.

In testimony whereof I affix my signature.

ALBERT RADTKE.